(12) United States Patent
MacLennan et al.

(10) Patent No.: US 9,168,599 B2
(45) Date of Patent: Oct. 27, 2015

(54) SAW DISK WITH IMPROVED CHIP DISCHARGE

(75) Inventors: Charles MacLennan, Rigaud (CA); Robert MacLennan, Pointe Claire (CA)

(73) Assignee: LES EQUIPEMENTS PRENBEC INC., St-Eustache (CA)

( * ) Notice: Subject to any disclaimer, the term of this patent is extended or adjusted under 35 U.S.C. 154(b) by 322 days.

(21) Appl. No.: 13/298,686

(22) Filed: Nov. 17, 2011

(65) Prior Publication Data

US 2013/0125724 A1    May 23, 2013

(51) Int. Cl.
| | |
|---|---|
| B27B 13/02 | (2006.01) |
| B27B 33/02 | (2006.01) |
| B23D 61/02 | (2006.01) |
| B23D 61/06 | (2006.01) |

(52) U.S. Cl.
CPC .............. B23D 61/021 (2013.01); B23D 61/06 (2013.01); *Y10T 83/768* (2015.04); *Y10T 83/9319* (2015.04)

(58) Field of Classification Search
CPC ...... B23D 61/04; B23D 61/14; B23D 61/023; B23D 61/021; B23D 61/06; Y10T 83/768; Y10T 83/9319; B27B 33/12; B27B 33/144; B23B 27/143; B23B 27/1618; B23B 27/1637; B23B 2200/321; B23B 2200/323
USPC .............................. 83/835, 840; 144/34.1, 241
See application file for complete search history.

(56) References Cited

U.S. PATENT DOCUMENTS

| | | | |
|---|---|---|---|
| 912,774 A * | 2/1909 | Aupperle et al. ................ 83/840 |
| 2,422,111 A * | 6/1947 | Lundberg ........................ 83/844 |
| 2,994,350 A * | 8/1961 | Lundberg ........................ 83/845 |
| 3,362,446 A * | 1/1968 | Potomak ......................... 83/855 |
| 3,490,117 A | 1/1970 | Hertel | |
| 3,576,061 A * | 4/1971 | Pahlitzsch ....................... 407/60 |
| 3,619,880 A | 11/1971 | Pahlitzsch | |
| 3,818,561 A | 6/1974 | Montana et al. | |
| 3,945,289 A | 3/1976 | Baez Rios | |
| 4,018,255 A | 4/1977 | Diggs | |
| 4,116,576 A | 9/1978 | Gawryk, Sr. | |

(Continued)

FOREIGN PATENT DOCUMENTS

| | | |
|---|---|---|
| CA | 1103130 | 6/1981 |
| CA | 1269028 | 5/1990 |

(Continued)

OTHER PUBLICATIONS

High Speed Saw Discs, Assured Performance, Product Catalogue, Gilbert Products Inc., Dec. 2005, Canada.

*Primary Examiner* — Ghassem Alie
*Assistant Examiner* — Bharat C Patel
(74) *Attorney, Agent, or Firm* — Norton Rose Fulbright Canada LLP

(57) ABSTRACT

A cutting disk for a rotary cutting machine includes a disk body having a central axis of rotation and a circumferentially extending outer periphery. A plurality of circumferentially spaced apart cutting teeth is mounted to the outer periphery of the disk body. A chip pocket is defined in the circumferential outer periphery of the disk body between each of the circumferentially spaced apart cutting teeth. Each chip pocket is formed by a chip clearance surface extending radially inwardly into the disk body to form the chip pocket between circumferentially adjacent cutting teeth. The chip pocket is adapted to receive a tooth-produced chip therein, thereby providing more room for chip discharge and thus reducing disk wear.

11 Claims, 3 Drawing Sheets

(56) References Cited

U.S. PATENT DOCUMENTS

| | | | | |
|---|---|---|---|---|
| 4,189,264 A | | 2/1980 | Kraemer | |
| 4,324,163 A | * | 4/1982 | LaVelle | 83/855 |
| 4,417,833 A | * | 11/1983 | Wertheimer | 407/61 |
| 4,515,055 A | * | 5/1985 | Scott | 83/835 |
| 4,587,876 A | * | 5/1986 | Erhardt | 83/839 |
| 4,682,916 A | | 7/1987 | Briese | |
| 4,690,185 A | | 9/1987 | Hamilton | |
| 4,744,278 A | * | 5/1988 | Wright | 83/839 |
| 4,765,217 A | | 8/1988 | Ludwig | 83/841 |
| 4,879,936 A | * | 11/1989 | Anderson | 83/842 |
| 4,906,145 A | | 3/1990 | Oliver | |
| 4,932,447 A | | 6/1990 | Morin | |
| 4,947,721 A | * | 8/1990 | Anderson | 83/843 |
| 4,955,273 A | * | 9/1990 | Pawlosky | 83/845 |
| 5,026,248 A | | 6/1991 | Hamilton | |
| 5,044,409 A | | 9/1991 | Hamilton | |
| 5,058,477 A | | 10/1991 | MacLennan | |
| 5,067,858 A | | 11/1991 | Cook | |
| 5,085,112 A | | 2/1992 | MacLennan | |
| 5,088,371 A | | 2/1992 | MacLennan | |
| 5,113,919 A | | 5/1992 | MacLennan | |
| 5,129,438 A | | 7/1992 | Hamilton | |
| 5,131,305 A | | 7/1992 | MacLennan | |
| 5,161,588 A | | 11/1992 | Hamilton | |
| 5,205,199 A | | 4/1993 | MacLennan | |
| 5,207,748 A | | 5/1993 | Katbi et al. | |
| 5,211,212 A | | 5/1993 | Carlson et al. | |
| 5,233,818 A | | 8/1993 | Dettbarn | |
| 5,261,306 A | * | 11/1993 | Morey et al. | 83/840 |
| 5,303,752 A | | 4/1994 | MacLennan | |
| 5,307,719 A | | 5/1994 | MacLennan | |
| 5,377,730 A | | 1/1995 | Hamilton | |
| 5,377,731 A | * | 1/1995 | Wildey | 144/241 |
| 5,451,087 A | | 9/1995 | Beaulieu | |
| 5,477,754 A | | 12/1995 | Herbon | |
| 5,481,952 A | | 1/1996 | MacLennan | |
| 5,529,440 A | | 6/1996 | Schmidt | |
| 5,579,674 A | | 12/1996 | Wildey | |
| 5,644,965 A | | 7/1997 | MacLennan et al. | |
| 5,647,263 A | | 7/1997 | Wildey | |
| 5,702,210 A | | 12/1997 | Boianjiu | |
| 5,743,314 A | | 4/1998 | Puch | |
| 5,810,520 A | | 9/1998 | Hintze et al. | |
| 5,813,308 A | | 9/1998 | Wildey et al. | |
| 5,820,308 A | | 10/1998 | Hoefler | |
| 5,873,534 A | | 2/1999 | Shinn | |
| 5,908,060 A | | 6/1999 | Fargeot | |
| 5,975,166 A | | 11/1999 | MacLennan | |
| 6,026,719 A | | 2/2000 | Li | |
| 6,196,106 B1 | * | 3/2001 | Kurelek et al. | 83/841 |
| 6,516,841 B1 | | 2/2003 | Oilund | |
| 6,536,322 B1 | | 3/2003 | Butler et al. | |
| 6,551,051 B2 | | 4/2003 | Perron et al. | |
| D488,174 S | | 4/2004 | East | |
| 6,725,758 B2 | | 4/2004 | MacLennan et al. | |
| 6,810,783 B1 | | 11/2004 | Larose | |
| 6,883,412 B1 | * | 4/2005 | Turfitt | 83/835 |
| 6,966,729 B2 | | 11/2005 | Dehn et al. | |
| 7,128,066 B2 | * | 10/2006 | Lee et al. | 125/22 |
| 7,163,361 B2 | * | 1/2007 | Hecht | 407/109 |
| 7,832,320 B2 | * | 11/2010 | Earle et al. | 83/839 |
| 2002/0002892 A1 | | 1/2002 | DiSabatino | |
| 2004/0216580 A1 | * | 11/2004 | Taillon | 83/835 |
| 2004/0238067 A1 | | 12/2004 | Ries | |
| 2007/0193428 A1 | | 8/2007 | MacLennan | |
| 2008/0276781 A1 | * | 11/2008 | Egger et al. | 83/661 |

FOREIGN PATENT DOCUMENTS

| | | |
|---|---|---|
| CA | 2011788 | 4/1992 |
| CA | 1325159 | 12/1993 |
| CA | 2084013 | 11/1994 |
| CA | 2048090 | 4/1996 |
| CA | 2095704 | 7/1996 |
| CA | 2116303 | 10/1996 |
| CA | 2120595 | 3/1997 |
| CA | 2029829 | 7/1998 |
| CA | 2085017 | 1/1999 |
| CA | 2242538 | 2/2000 |
| CA | 2186798 | 2/2001 |
| CA | 2232244 | 4/2003 |
| CA | 2354315 | 5/2004 |
| CA | 2422463 | 1/2006 |
| CA | 2568404 | 5/2007 |
| CA | 2588927 | 8/2008 |

* cited by examiner

SAW DISK WITH IMPROVED CHIP DISCHARGE

TECHNICAL FIELD

The present invention relates generally to cutting disks for rotary cutting machines, and more particularly to a circular saw disk configured to provide improved chip discharge therefrom.

BACKGROUND

Rotary cutting machines, such as circular saws, brush mowers, stump grinders and the like, are used in various applications which include, but are not limited to, felling trees and other natural plant growth in the forestry industry, cutting rock and/or earth in the mining and construction industries, cutting up items such as used tires and other man-made products in various industrial applications, mowing brush and other material, and in agriculture. Relatively smaller circular saws are further used in countless other smaller-scale applications, from home renovation to commercial construction. Depending on the type of circular saw, the central disk of the saw either rotates (particularly for the smaller circular saws, for example) or remains rotationally fixed but has teeth on linked holders which rotate about the periphery of the saw disk, much as per chain saws.

Regardless of the type of circular saw, a plurality of such cutting teeth rotate, whether independently about the periphery of the rotationally-stationary disk or together with the rotating disk when fixed thereto, in order to cut into the workpiece material to be cut.

Known saw disks, particularly large circular saws such as those used for felling trees or cutting through large volumes of material, typically include a plurality of saw teeth positioned about the periphery of the disk. Often, these saw teeth are removable from an associated holder that is mounted to the circular periphery of the saw disk. This enables broken saw teeth and/or teeth with worn cutting edges to be removed for either replacement, repair or re-conditioning. Each of these holders project substantially radially outward from the circular disk, as seen in FIG. 4, allowing the removable teeth to be fastened thereon.

Such saw teeth are typically mounted to the outer peripheral edge of the circular saw disk at an angle, for example at an angle that is slightly greater than a tangential axis relative to the outer perimeter of the saw disk. Accordingly, the material chips which come off the cutting edge or edges of each saw tooth must be discharged from between the saw teeth and away from the disk, such as to permit optimal cutting. While the rotation of the saw disk tends to aid in this discharge of material chips, it has been found that chips sometimes remain lodged between teeth and the next adjacent tooth holder about the outer periphery of the saw disk.

Accordingly, a disk for a rotary cutting machine which provides improved chip discharge is sought.

SUMMARY OF THE INVENTION

It is an object of the present invention to provide an improved cutting disk for a rotary cutting machine.

Therefore, in accordance with an aspect of the present invention, there is provided a cutting disk for a rotary cutting machine, the cutting disk comprising: a disk body having a central axis of rotation and a circumferentially extending outer periphery; a plurality of circumferentially spaced apart cutting teeth mounted to the outer periphery of the disk body; and a chip pocket defined in the circumferential outer periphery of the disk body between each of the circumferentially spaced apart cutting teeth, each said chip pocket being formed by a chip clearance surface extending radially inwardly into the disk body to form the chip pocket between circumferentially adjacent ones of the cutting teeth on the cutting disk, such that the chip pocket is adapted to receive a tooth-produced chip therein.

There is also provided, in accordance with another aspect of the present invention, a circular saw disk comprising a central axis of rotation and a circumferentially extending outer periphery having a plurality of circumferentially spaced apart tooth holders disposed on the outer periphery thereof, each of the tooth holders having at least one saw tooth removably mounted thereto, a chip pocket being defined in the outer periphery of the saw disk adjacent each saw tooth such as to receive a tooth-produced chip therein, the chip pocket being defined by a chip clearance surface which extends radially inwardly into the saw disk from the outer periphery thereof to form a cavity defining the chip pocket, the cavity having at least an opening in a radial outer portion of the outer periphery of the saw disk.

There is also provided, in accordance with another aspect of the present invention, a circular saw disk comprising a disk body having a central axis of rotation and a circumferentially extending outer periphery, a plurality of circumferentially spaced apart tooth holders being disposed on the outer periphery of the disk body, each of the tooth holders being adapted to receive a saw tooth mounted thereto, a chip pocket being defined in the outer periphery of the saw disk adjacent each of said tooth holders such as to receive a tooth-produced chip therein, the chip pocket being defined by a curved chip clearance surface extending concavely into the disk body from the outer periphery thereof to form a radially concave cavity in the disk body defining the chip pocket.

There is further provided, in accordance with another aspect of the present invention, a method of forming a more wear-resistant circular saw disk, the saw disk defining a central axis of rotation and having a plurality of circumferentially spaced apart saw teeth removably mounted to an outer periphery of a disk body of the saw disk, the method comprising: forming a concave chip pocket in the disk body forward of each of the saw teeth relative to a direction of rotation of the saw disk about said central axis, including forming a curved chip clearance surface extending radially inwardly into the disk body from the outer periphery thereof to form the concave chip pocket between circumferentially adjacent ones of the cutting teeth on the cutting disk, each said chip pocket being adapted to receive a tooth-produced chip therein.

BRIEF DESCRIPTION OF THE DRAWINGS

Further features and advantages of the present invention will become apparent from the following detailed description, taken in combination with the appended drawings, in which.

DETAILED DESCRIPTION OF THE PREFERRED EMBODIMENT

The present disclosure relates generally to a cutting disk of a rotating cutting machine. Rotary cutting machines as defined herein are intended to include any cutting machine having a rotating disk, drum, cylinder or chain, etc, which has teeth about the circumferential periphery thereof, whether the teeth are fixed to the disk/drum/cylinder which in turn rotates or alternately the teeth rotate about the periphery of a fixed disk/drum/cylinder. Such rotary cutting machines may include, for example only, circular saws, chain saws, brush mowers, stump grinders, material shredders and the like. Such rotary cutting machines may be used in various applications which include, but are not limited to, felling trees and other natural plant growth in the forestry industry, cutting rock and/or earth in the mining and construction industries, shredding items such as used tires and other man-made products in various industrial applications, mowing brush and other material, and for cutting or grinding in agriculture.

The term "saw tooth" or "cutting tooth" is used herein to refer to a cutting implement or tooth for use in a rotary cutting machine as defined above. Preferably, although not necessarily, such cutting teeth are replaceable and therefore the cutting teeth are removably mounted to the periphery of a disk or drum of the machine, such as a circular saw having a saw disk with such replaceable saw teeth mounted about the periphery thereof, either fixed directly thereto or through a holder. It is therefore understood that such cutting teeth include teeth mounted to a rotating cutting machine that is not a circular saw, such as a drum mower, brush cutter or grinder, and that these cutting teeth can be either removably mounted or permanently fixed to the disk or drum.

Figure 1:
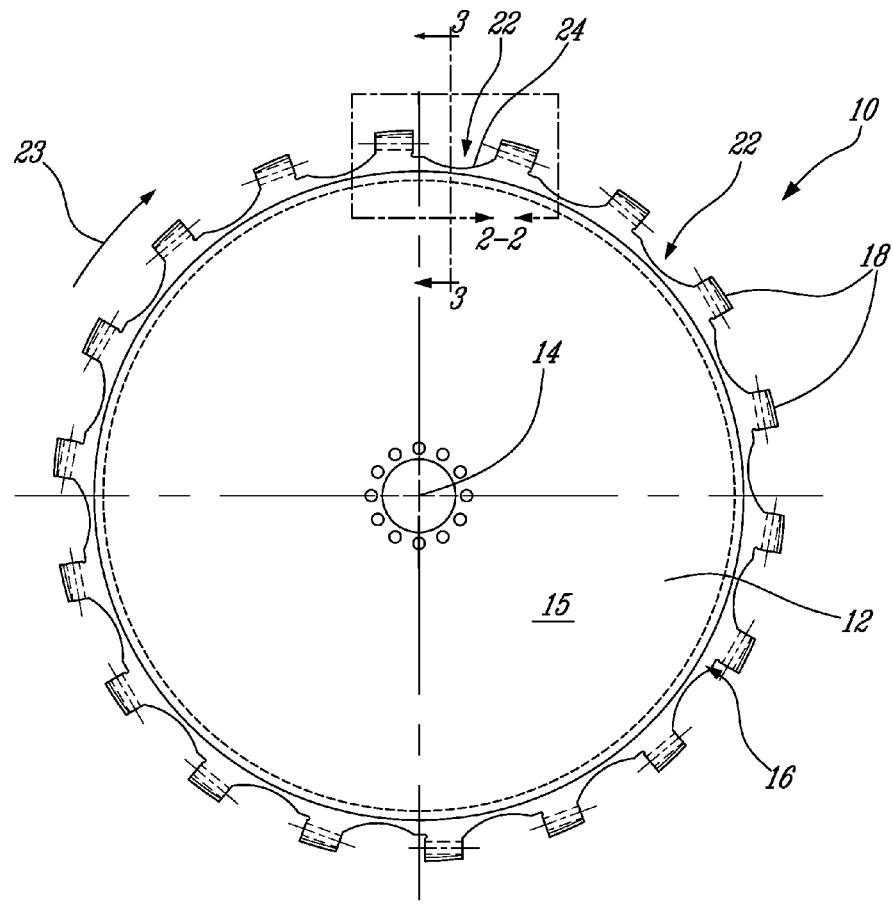
FIG. 1 is a side elevation view of a saw disk in accordance with one aspect of the present invention.
Figure 2:
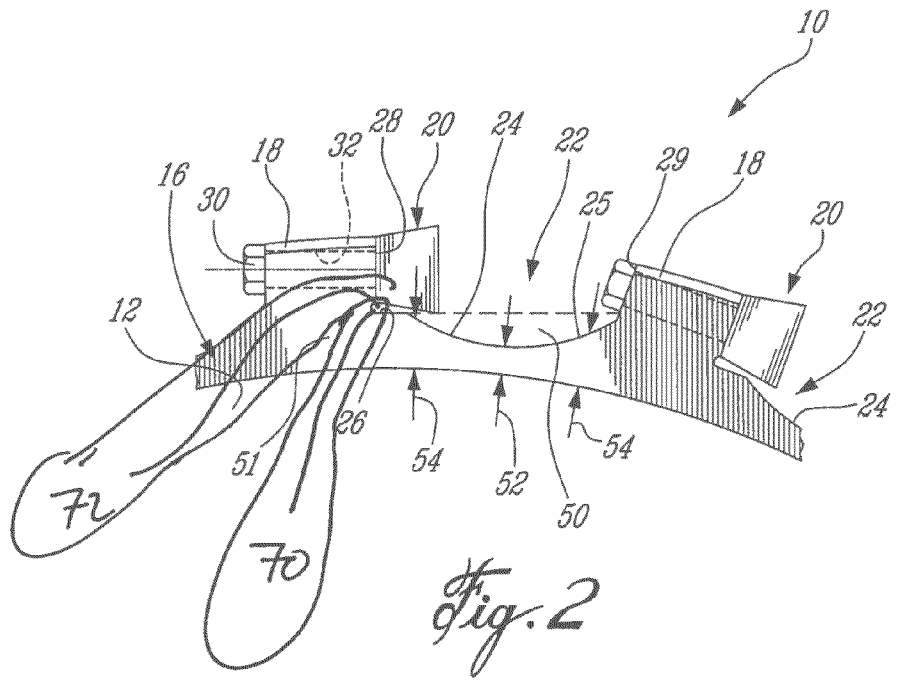
FIG. 2 is a partial, enlarged side elevation view of the saw disk of FIG. 1, taken from region 2 in FIG. 1.
Figure 3:
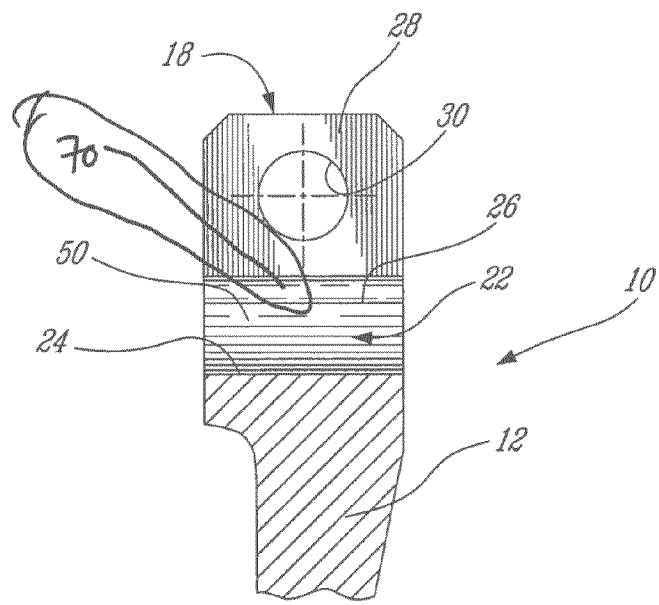
FIG. 3 is a cross-sectional view of the saw disk of FIG. 1, taken through line 3-3 in FIG. 1.

Referring now to FIGS. 1-3, a saw disk 10 in accordance with one aspect of the present disclosure includes a disk body 12 which defines a substantially circular shape and has a central axis of rotation 14 about which the disk is rotated when in use in a circular saw or other rotary cutting machine. The disk body 12 of the saw disk 10 includes a circumferentially extending outer periphery 16, which generally interconnects the planar surfaces 15 on opposed sides of the substantially flat disk body 12. A plurality of circumferentially spaced apart tooth holders 18 are disposed on the outer periphery 16 of the disk body 12 and which, at least this embodiment, protrude generally radially outward from the outer periphery 16 and therefore also from the central axis of rotation 14 of the disk. The tooth holders 18 are preferably integrally formed (i.e. monolithic) with the disk body 12, however it is also possible to separately form the tooth holders and fasten them, likely but not necessarily permanently, to the outer periphery 16 of the disk body 12.

As seen in FIG. 2, each of the tooth holders 18 is configured to receive at least one cutting tooth 20 thereon, such as to form a toothed circular saw disk. The cutting teeth 20 are preferably removably mounted to the tooth holders 18, thereby permitting each of the cutting teeth 20 to be individually removed and replaced as required. However, it is to be understood that the cutting disk 10 may alternately have cutting teeth 20 thereon which are permanently fixed to the outer periphery of the disk body, whether by regularly protruding holders 18 as shown in FIG. 1, or alternately by other fixation means. Accordingly, the cutting disk or saw disk 10 of the present disclosure may simply include a disk body 12 having a plurality of circumferentially spaced apart cutting teeth 20 mounted to the outer periphery 16 thereof.

As seen in FIGS. 1 and 2, the saw disk 10 has a plurality of large chip pockets 22 formed in the outer periphery 16 of the disk body 12. The chip pockets 22 are circumferentially spaced apart about the outer periphery 16 and located such that a chip pocket 22 is disposed at least immediately in front of each tooth holder 18 and/or each cutting tooth 20, relative to a direction of rotation 23 of the cutting disk 10 about the axis of rotation 14. Accordingly, the chip pockets 22 are circumferentially spaced apart such that at least one chip pocket 22 is defined in the circumferential outer periphery 16 of the disk body 12 between each of the circumferentially spaced apart tooth holders 18. Each chip pocket 22 may circumferentially extend, as shown in FIG. 1 for example, substantially uninterrupted between adjacent tooth holders 18.

Each of the chip pockets 22 is located and formed in such a manner so as to receive a material chip therein which is produced by the cutting teeth 20 when the saw disk is in operation. The chip pockets 22 therefore provide for improved chip discharge from the saw disk 10 due to the pocket or cavity which enables a chip produced by the cutting tooth to be first smoothly received in the pocket and subsequently discharged therefrom, by centrifugal force, once the saw disk is free of the tree or other material being cut.

As seen in FIGS. 1 and 2, the chip pockets 22 are preferably formed by a radially inwardly curved chip clearance surface 24 which extends inwardly into the disk body 12 to form the chip pocket 22 between circumferentially adjacent ones of the tooth holders 18. Accordingly, this radially inwardly curved chip clearance surface 24 is substantially concave to define a substantially concave open cavity 50 which forms the chip pocket 22. This concave cavity 50 formed between the tooth holders 18, and therefore the cutting teeth 20 mounted thereto, provides more room for the chip to be accommodated and subsequently discharged during operation of the saw disk, which in turn reduces disk wear over the life span of the saw disk. This may be particularly useful for applications where the saw disk 10 is used in an environment having sand, grit or other particulate debris which causes wear, which have been known to create cracks in the disk. Accordingly, the concave curved chip clearance surface 24 helps to reduce such cracks from occurring in the disk, while permitting the concave pocket 22 formed thereby to receiving a chip which can easily slide into the chip pocket once cut from the tree by the cutting teeth 20, and then cleanly be discharged from the chip pocket due to centrifugal force.

As best seen in FIG. 2, the concave open cavity 50 defined by the radially inwardly curved chip clearance surface 24 is such that a radial thickness of an outer peripheral portion 16 of the disk is non-constant between adjacent tooth holders 18, such that the curved chip pocket similarly defines a radial depth that is non-constant in a circumferential direction. More particularly, in the depicted embodiment, a first radial thickness 52 of the outer peripheral rim 51 of the disk 16, at a substantially midpoint of the concave cavity 50, is less than a second radial thickness 54 of the outer peripheral rim 51 of the disk at a point therein proximate the tooth holders 18 on either end of the chip pocket 22. As such, as seen in FIG. 2, the concave cavity 50 formed in the disk outer peripheral surface is, in at least the depicted embodiment, substantially crescent shaped, having a greater radial cavity depth at circumferential midpoint of the chip pocket and a small radial cavity at opposed ends of the chip pocket.

The curved chip clearance surface 24 has a forward end 25 that may, in at least one possible embodiment, integrally extend into a radially extending rear surface 29 of the next adjacent tooth holder 18, such as to form a smooth curvature along a full length of the chip clearance surface 24. This curved surface helps the chip to readily slide into the chip pocket 22 at the tooth end thereof once the chip is produced and then slide out of the chip pocket again upon discharge by centrifugal force.

As best seen in FIG. 2, the concave curved chip clearance surface 24 defines a radius of curvature which may, in at least one embodiment, be substantially constant along a majority of the circumferential length of the chip pocket and which substantially continuously extends between the adjacent tooth holders. In one possible embodiment, however, the radius of curvature of the concave chip clearance surface 24 may become smaller at the forward end 25 thereof as noted above.

Additionally, a chip mounting plateau surface 26, or simply flat mounting surface 26, may be provided immediately adjacent the radially extending front surface 28 of each tooth holder 18 such as to permit the cutting tooth 20 to be securely mounted to the tooth holder. As shown in both FIGS. 2 and 3, a rounded corner 70 is disposed at the intersection between the radial front surface 28 of each tooth holder 18 and defined between each tooth 20 and the rounded corner 70. The plateau mounting surface 26 may for example be used to help prevent rotation of the cutting tooth when removably mounted to the tooth holder 18, thereby supporting and helping to locate the cutting teeth in place about the periphery of the saw disk. Although in the embodiment shown in FIG. 2 the cutting teeth 20 extend at least partially beyond the plateau surface 26 such that they overhang a portion of the curved chip clearance surface 24 and thus extend somewhat into the chip pocket 22, it is to be understood that this plateau surface 26 and the tooth 20 may be so configured such that the cutting tooth 20 fits flushly on the plateau surface 26 and therefore does not unduly protrude out into the chip pocket 22.

As best seen in FIG. 3, the concave cavity 50 formed by the curved chip clearance surface 24 in the outer periphery 16 of the disk is such that the chip pocket 22 formed thereby has open lateral sides. However, it is also possible that the chip pocket 22 is at least partially enclosed on the lateral edges thereof, providing that the chip produced from the cutting teeth 20 can still smoothly enter the chip pocket 22 without obstruction and subsequently be readily discharged therefrom, for example by centrifugal force of the rotating disk.

As seen in FIG. 2, the cutting teeth 20 are preferably removably mounted to the tooth holders 18 such that the teeth can be removed and replaced when required, for example when the teeth become worn. However, as noted above, in an alternate embodiment whereby the entire disk is replaced when worn (for example for a smaller circular saw disk intended for domestic or light industrial use), the cutting teeth 20 may be permanently fastened to the outer periphery 16 of the saw disk body 12 using either the radially projecting tooth holders 18 or an alternate mounting means, for example whereby the teeth are permanently fastened (by welding, for example) and/or integrally formed with the outer periphery of the disk. In the depicted embodiment of FIGS. 1-3, each tooth 20 is removably fastened to a tooth holder 18 using a fastener 30, such as a bolt, which extends through a bore 32 formed in the tooth holder 18 which mates with the cutting tooth 20 such as to removably fasten the cutting tooth in place on the disk periphery. Alternate removable fastening configurations may of course also be employed.

While the chip pocket 22 which extends inwardly into the disk body has been generally described above with reference to the depicted embodiment whereby the chip clearance surface 24 is curved and thereby forms a concave chip pocket, is to be understood that chip pockets having other shapes, such as one having a chip clearance surface which is not necessarily curved, may also be possible. For example, a rectangular and/or square shaped chip pocket may also be formed between each of the tooth holders 18. Provided that the chip pocket so formed is configured such that it is sufficiently large to receive therein a material chip produced by the cutting teeth 20 during a cutting action and subsequently discharged from the chip pocket, other shapes of chip pockets can be used. As such, the chip discharged surface 24 may neither be continuous nor curved, provided that the chip pocket 22 formed thereby performs the above-noted functions. However, having a curved chip discharged surface 24 may help reduce the occurrence of cracks forming in the disk, particularly when the saw disk is employed in a high stress environment, for example where abrasive material such as sand and grit may be present.

Figure 4:
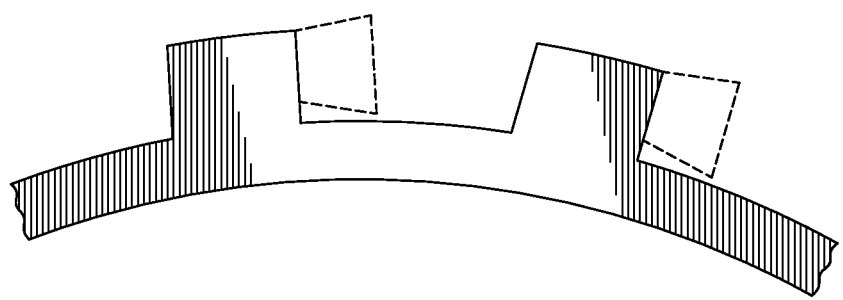
FIG. 4 is a partial, enlarged side elevation view of a saw disk of the Prior Art.
Figure 2:
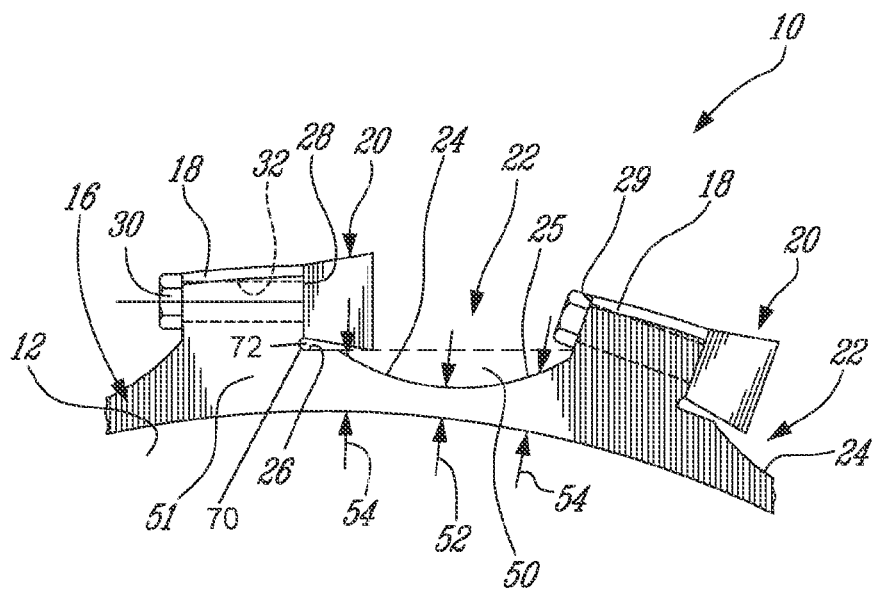
Figure 3:
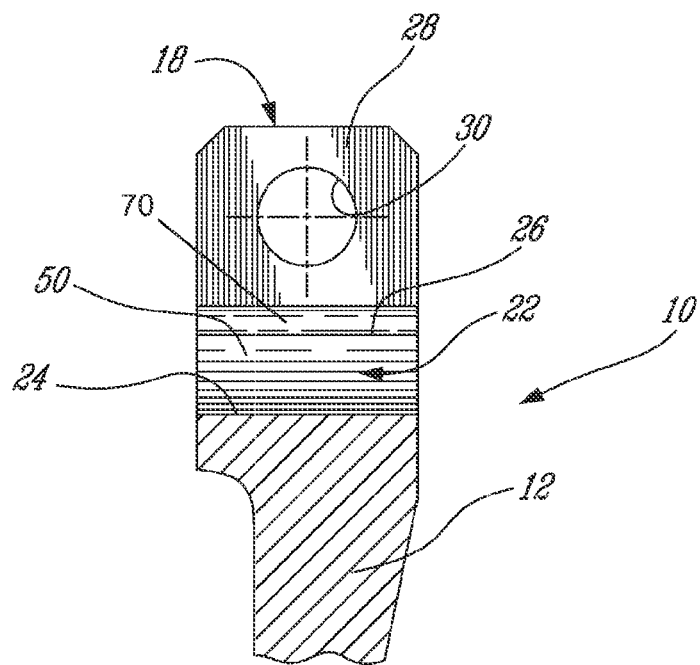

FIG. 4 schematically shows a peripheral edge of a prior art saw disk which is absent of any chip discharged pockets between the tooth holders and/or teeth of the saw disk. More particularly, the outer peripheral surface between each of the tooth holders is not radially inwardly curved or otherwise formed such as to define a radially inwardly extending chip pocket. Accordingly, in the standard configuration of prior art disks, material chips tend to become jammed between adjacent cutting teeth and/or teeth holders, and do not readily discharge during operation of the saw disk. This has been found to unduly speed up the wear of the disk and/or cutting teeth, which is clearly undesirable.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims.

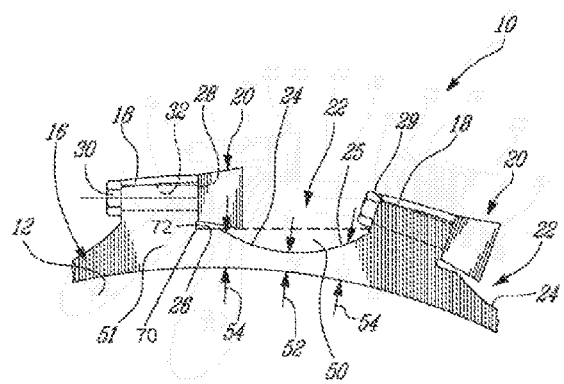

The invention claimed is:

1. A cutting disk for a rotary cutting machine, the cutting disk comprising: a disk body having a central axis of rotation and a circumferentially extending outer periphery; a plurality of circumferentially spaced apart cutting teeth mounted to the outer periphery of the disk body; and a chip pocket defined in the circumferential outer periphery of the disk body between each of the circumferentially spaced apart cutting teeth, the chip pocket extending between a first radial surface and a second radial surface disposed on a forward adjacent cutting tooth, the second radial surface disposed forward of the first radial surface with respect to a direction of rotation of the cutting disk, the chip pocket having a flat mounting surface extending forwardly from the first radial surface and a rounded corner at an intersection of the first radial surface and the mounting surface, a gap being defined between each tooth and the rounded corner, the chip pocket having a concave chip clearance surface extending a circumferential length between the flat mounting surface and the second radial surface, the chip clearance surface being curved along the entire circumferential length and extending radially inwardly into the disk body, the chip clearance surface having a radial depth at a circumferential midpoint thereof that is less than a length of a line extending between the flat mounting surface and the second radial surface, the chip clearance surface defining laterally opposed open sides, both open sides being spaced from the central axis of rotation at equal radial distances, wherein the chip pocket is adapted to receive workpiece chips therein produced by the cutting teeth and discharge said chips therefrom while limiting disk wear caused by the chips.

2. The cutting disk of claim 1, wherein the concave chip clearance surface defines a radius of curvature and extends between said circumferentially adjacent ones of the cutting teeth.

3. The cutting disk of claim 2, wherein the radius of curvature of the concave chip clearance surface is substantially constant.

4. The cutting disk of claim 1, wherein the rotary cutting machine is a circular saw and the cutting disk is a saw disk.

5. The cutting disk of claim 1, further comprising a plurality of tooth holders disposed about the circumferentially extending outer periphery, each of the tooth holders having at least one of said cutting teeth removably mounted thereto.

6. The cutting disk of claim 5, wherein the tooth holders are circumferentially spaced apart on the outer periphery of the disk body and protrude radially outward therefrom.

7. The cutting disk of claim 6, wherein the tooth holders are integrally formed with the disk body.

8. The cutting disk of claim 1, wherein the curved chip pocket defines a concave cavity having a non-constant radial depth.

9. The cutting disk of claim 8, wherein the concave cavity is substantially crescent shaped, having a greater radial cavity depth at circumferential midpoint of the curved chip pocket and a smaller radial cavity depth at circumferentially opposed ends of the curved chip pocket.

10. A rotary cutting machine having a cutting disk as defined in claim 1.

11. The cutting disk of claim 1, wherein the chip pocket is disposed forward of each said cutting tooth with respect to a direction of rotation of the cutting disk.

* * * * *

UNITED STATES PATENT AND TRADEMARK OFFICE
CERTIFICATE OF CORRECTION

Page 1 of 3

PATENT NO.        : 9,168,599 B2
APPLICATION NO.   : 13/298686
DATED             : October 27, 2015
INVENTOR(S)       : MacLennan et al.

It is certified that error appears in the above-identified patent and that said Letters Patent is hereby corrected as shown below:

The Title page, showing the illustrative figure, should be deleted and substitute therefor the attached Title page.

Delete figs. 2 and 3 and substitute therefor the drawing sheet, consisting of figs. 2 and 3 as shown on the attached page.

Signed and Sealed this
Twenty-third Day of August, 2016

Michelle K. Lee
*Director of the United States Patent and Trademark Office*

(12) United States Patent
MacLennan et al.

(10) Patent No.: US 9,168,599 B2
(45) Date of Patent: Oct. 27, 2015

(54) SAW DISK WITH IMPROVED CHIP DISCHARGE

(75) Inventors: Charles MacLennan, Rigaud (CA); Robert MacLennan, Pointe Claire (CA)

(73) Assignee: LES EQUIPEMENTS PRENBEC INC., St-Eustache (CA)

(*) Notice: Subject to any disclaimer, the term of this patent is extended or adjusted under 35 U.S.C. 154(b) by 322 days.

(21) Appl. No.: 13/298,686

(22) Filed: Nov. 17, 2011

(65) Prior Publication Data
US 2013/0125724 A1 May 23, 2013

(51) Int. Cl.
| B27B 13/02 | (2006.01) |
| B27B 33/02 | (2006.01) |
| B23D 61/02 | (2006.01) |
| B23D 61/06 | (2006.01) |

(52) U.S. Cl.
CPC ............ B23D 61/021 (2013.01); B23D 61/06 (2013.01); *Y10T 83/768* (2015.04); *Y10T 83/9319* (2015.04)

(58) Field of Classification Search
CPC ...... B23D 61/04; B23D 61/14; B23D 61/023; B23D 61/021; B23D 61/06; Y10T 83/768; Y10T 83/9319; B27B 33/12; B27B 33/144; B23B 27/143; B23B 27/1618; B23B 27/1637; B23B 2200/321; B23B 2200/323
USPC .................. 83/835, 840; 144/34.1, 241
See application file for complete search history.

(56) References Cited

U.S. PATENT DOCUMENTS

| 912,774 A * | 2/1909 | Aupperle et al. ............ 83/840 |
| 2,422,111 A * | 6/1947 | Lundberg .................... 83/844 |
| 2,994,350 A * | 8/1961 | Lundberg .................... 83/845 |
| 3,362,446 A * | 1/1968 | Potomak .................... 83/855 |
| 3,490,117 A | 1/1970 | Hertel |
| 3,576,061 A * | 4/1971 | Pahlitzsch ................... 407/60 |
| 3,619,880 A | 11/1971 | Pahlitzsch |
| 3,818,561 A | 6/1974 | Montana et al. |
| 3,945,289 A | 3/1976 | Baez Rios |
| 4,018,255 A | 4/1977 | Diggs |
| 4,116,576 A | 9/1978 | Gawryk, Sr. |

(Continued)

FOREIGN PATENT DOCUMENTS

| CA | 1103130 | 6/1981 |
| CA | 1269028 | 5/1990 |

(Continued)

OTHER PUBLICATIONS

High Speed Saw Discs, Assured Performance, Product Catalogue, Gilbert Products Inc., Dec. 2005, Canada.

*Primary Examiner* — Ghassem Alie
*Assistant Examiner* — Bharat C Patel
(74) *Attorney, Agent, or Firm* — Norton Rose Fulbright Canada LLP

(57) ABSTRACT

A cutting disk for a rotary cutting machine includes a disk body having a central axis of rotation and a circumferentially extending outer periphery. A plurality of circumferentially spaced apart cutting teeth is mounted to the outer periphery of the disk body. A chip pocket is defined in the circumferential outer periphery of the disk body between each of the circumferentially spaced apart cutting teeth. Each chip pocket is formed by a chip clearance surface extending radially inwardly into the disk body to form the chip pocket between circumferentially adjacent cutting teeth. The chip pocket is adapted to receive a tooth-produced chip therein, thereby providing more room for chip discharge and thus reducing disk wear.

11 Claims, 3 Drawing Sheets